United States Patent [19]

Sargeant

[11] 4,073,951
[45] Feb. 14, 1978

[54] AGGLOMERATION METHOD

[76] Inventor: Ralph G. Sargeant, 408 W. Windsor St., Lakeland, Fla. 33803

[21] Appl. No.: 717,662

[22] Filed: Aug. 25, 1976

Related U.S. Application Data

[63] Continuation-in-part of Ser. No. 461,964, April 18, 1974, abandoned.

[51] Int. Cl.$^2$ .......................... A23L 2/22; A21D 6/00
[52] U.S. Cl. .................................. 426/237; 426/241; 426/242; 426/244; 426/453; 426/285
[58] Field of Search ............... 426/285, 453, 244, 247, 426/236, 237, 241, 242; 99/451; 209/5, 214, 127 R, 127 A, 127 B, 127 C; 219/10.81, 10.69, 10.73, 10.71, 10.55 A; 264/3 C, 3 R, 27, 117, 121

[56] References Cited

U.S. PATENT DOCUMENTS

| | | | |
|---|---|---|---|
| 3,143,428 | 8/1964 | Reimers et al. ................... 426/285 |
| 3,432,636 | 3/1969 | Sargeant ............................ 426/244 X |
| 3,463,642 | 8/1969 | Sigman .............................. 426/453 |
| 3,703,861 | 11/1972 | Slack et al. ....................... 99/451 |

FOREIGN PATENT DOCUMENTS 205,369  1/1957  Australia ............................. 426/453

*Primary Examiner*—Jeanette M. Hunter
*Attorney, Agent, or Firm*—Roylance, Abrams, Berdo & Kaul

[57] ABSTRACT

Method for agglomerating finely divided particulate solid materials which are capable of agglomerating by intersurface moisture for inter-particle adherence. A mass of the particulate material in a cool atmosphere in an agglomeration zone is simultaneously agitated and subjected to electromagnetic radiation to cause the free moisture contained within the particles to appear in liquid state at the surfaces of the particles so that, with the agitation causing random particle-to-particle contact, agglomeration by inter-particle adherence occurs in the same manner as if extraneous moisture had been introduced. Advantageously, radio frequency energy is employed to accomplish dielectric heating of the moisture within the particle, the moisture escaping to the surface of the particle but persisting there in liquid state because the solid matter of the particle is not heated to a temperature such as to cause unduly rapid vaporization of the moisture. In addition to accomplishing agglomeration without adding extraneous moisture, the method has the advantages of reducing the moisture content and essentially sterilizing the agglomerated material.

15 Claims, 6 Drawing Figures

AGGLOMERATION METHOD

RELATED APPLICATIONS

This application is a continuation-in-part of my copending application Ser. No. 461,964, filed Apr. 18, 1974 now abandoned.

Apparatus disclosed herein is claimed in my U.S. Pat. No. 3,885,119, issued May 20, 1975, from application Ser. No. 461,963, filed Apr. 18, 1974. My copending application Ser. No. 717,663, filed concurrently herewith as a continuation-in-part of my aforementioned application Ser. No. 461,964, discloses and claims drying of explosive particulate materials by a method which is related to the method disclosed herein and which causes agglomeration of some particulate explosives.

BACKGROUND OF THE INVENTION

In many fields, it is necessary or desirable to agglomerate finely divided particulate solid materials, that is, to cause the fine particles to associate into aggregate particles of larger size. By agglomeration, it is possible to render finely particulate materials more dispersible in liquids, to convert particulate materials to a desired average particle size or to a predetermined particle size range, to control the bulk density of a finely particulate product, and to achieve a more intimate combination of different ingredients than is practical by, e.g., dry blending. Agglomeration is particularly necessary in connection with processes which manufacture particulate products, of which juice crystals are typical, in such fashion that a significant proportion of the product is in the form of fines and, being of too small particle size to be included in the salable product, must be recycled to the process unless the particle size can be increased by agglomeration.

While some particulate materials exhibit an inherent tackiness or adhesive character adequate to provide the inter-particle adherence necessary for agglomeration, the materials to be agglomerated are more frequently dry, free-flowing powders. For agglomerating such materials, it has long been the practice to add to them a liquid agglomerating agent, i.e., a liquid which will wet the particle surfaces in such manner as to promote inter-particle adherence when a mass of the particles is agitated. The liquid employed to wet the particles is usually water, introduced as a spray or mist or in the form of steam. Though the art of agglomeration is quite old and highly developed, no method has heretofore been proposed and adopted for agglomerating the usual free flowing powdery solids which does not depend upon the introduction of extraneous moisture, either in the form of a spray or mist or as steam.

Agglomerating methods based on introduction of extraneous moisture have achieved considerable success, particularly with materials which agglomerate with relative ease when moistened. However, such methods present problems even under favorable circumstances, and there has been a continuing need for improvement in the art. One such problem arises from the difficulty of adding the moisture in such fashion that surface moisture adequate for inter-particle adherence is applied substantially uniformly to all of the particles. It is also frequently difficult to accomplish adequate wetting of the particulate material within the time allowable for agglomeration. Additionally, there are finely particulate materials which do not agglomerate satisfactorily by the methods of the prior art even when adequate wetting of the material is achieved. Further, most agglomeration methods require drying of the agglomerated product to remove moisture added for agglomeration.

OBJECTS OF THE INVENTION

A general object of the invention is to devise a method for agglomerating without addition of extraneous moisture those materials which are capable of agglomerating by inter-particle adherence when moistened.

Another object is to accomplish agglomeration of finely divided free-flowing solid material by utilizing the native free water content of the particles as the source of moisture for promoting inter-particle adherence.

A further object is to provide an agglomerating method capable of agglomerating particulate materials which have heretofore been difficult to agglomerate or for which agglomeration has not heretofore been considered practical.

Yet another object is to devise an agglomerating method capable of providing an agglomerated product having a lower moisture content than is usually practical when such materials are agglomerated by prior-art methods.

Another object is to provide an agglomeration method which also sterilizes the product being agglomerated.

A still further object is to provide an agglomeration method which can be carried out on a continuous, rather than batch, basis.

SUMMARY OF THE INVENTION

The invention is based on the concept of causing the native free moisture content of a finely divided particulate free-flowing solid material to appear in liquid state at the surfaces of the particles of material, while agitating the material in a relatively cool gaseous atmosphere to accomplish agglomeration by inter-particle adherence. The method is operative with all materials which can be agglomerated by inter-particle adherence when moistened and which have an initial moisture content of at least 0.5% by weight. According to the invention, a mass of the particulate material to be agglomerated is agitated in an agglomeration zone in such fashion as to provide random particle-to-particle contact, and, while agitation continues, all of the particles of the mass are subjected to electromagnetic radiation in order to heat the native free moisture within the particles so as to cause a substantial portion of the moisture to escape to the surfaces of the particles and appear at the surfaces in liquid state. Advantageously, radio frequency radiation is employed so that only the free water content and not the solid matter of the particles is heated directly. Then, with the atmosphere in the agglomeration zone maintained sufficiently cool to prevent unduly rapid vaporization of the moisture from the surfaces of the particles, and with agitation continuing to provide random particle-to-particle contact, agglomeration occurs in the same manner as if the moisture on the particle surfaces had been introduced extraneously, though the method of this invention assures that the particle surfaces will be uniformly moistened. The agglomerated material is recovered from the agglomeration zone and can be cooled, as by being conveyed away by a pneumatic conveyor, and then classified for direct recycle of fines and recycle of the oversize after crushing.

In order that the manner in which the foregoing and other objects are achieved according to the invention can be understood in detail, particularly advantageous embodiments thereof will be described with reference to the accompanying drawings, which form part of the original disclosure hereof, and wherein.

GENERAL DESCRIPTION OF THE METHOD

Figure 1:
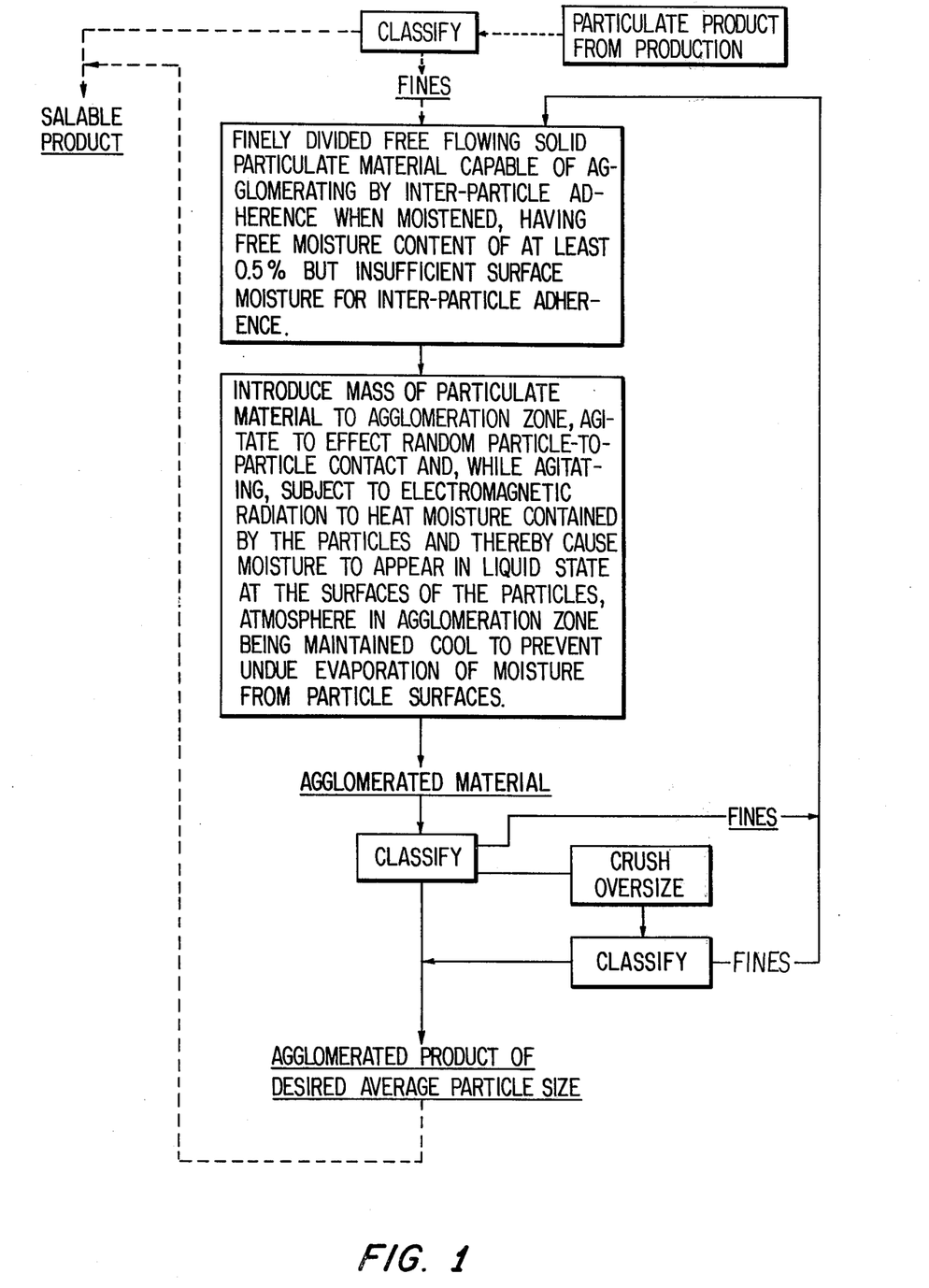
FIG. 1 is a flow diagram broadly illustrating the method.

Considering FIG. 1, the method is carried out by supplying a mass of the finely particulate free-flowing solid material which is to be agglomerated to an agglomeration zone in which a relatively cool gaseous atmosphere is maintained, agitating the mass of particulate material in a manner to cause random inter-particle contact, subjecting the agitated mass to electromagnetic radiation to heat the free moisture contained within the particles and cause at least a portion of the moisture to appear in liquid state at the surfaces of the particles, with the result that agglomeration by inter-particle adherence occurs, and recovering the agglomerated material. Recovery can include classification, with conventional reduction of the oversize material and recycling of the fines. As indicated by the broken lines in FIG. 1, the particulate material to be agglomerated can be the continuously supplied "fines" from a continuous process for producing a particulate product, and the agglomerated end product can be combined continuously with the salable product provided by the continuous process.

Figure 2:
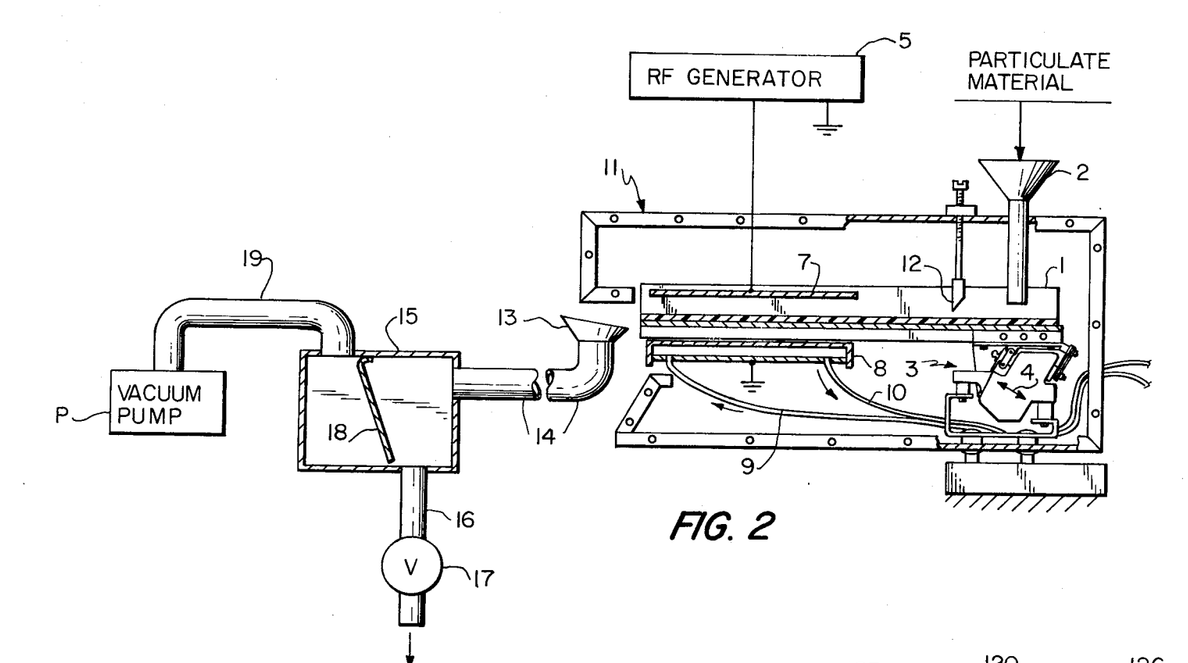
FIG. 2 is a semidiagrammatic view of one apparatus with which the invention can be practiced.

As shown in FIG. 2, the agglomeration zone can be defined by an elongated generally horizontal trough 1 of U-shaped transverse cross-section, and the material to be agglomerated can be supplied to one end of trough 1 via a feeding funnel 2. The trough is vibrated, as by a conventional electromagnetic vibrator 3, with the vibration being essentially reciprocatory along a line, such as line 4, which slants upwardly and toward the end of the trough opposite funnel 2. With the trough vibrated at, e.g., 3600 cycles per minute, particulate material supplied to the trough 1 by funnel 2 is both agitated and caused to traverse the trough, ultimately being discharged therefrom at the end opposite the funnel. The nature of the agitation caused by vibration of the trough is such that the particles are in movement through the atmosphere in which the trough is located for most of the time required to pass through the trough, contact of the particles with the trough being essentially instantaneous, and random particle-to-particle contact accordingly occurs.

Electromagnetic radiation is applied to the mass of particles throughout a major portion of the time required for the particulate material to traverse the length of the trough. Advantageously, radio frequency energy from a conventional RF generator 5 is applied via a coaxial cable 6 to electrode 7. Electrode 7 is located above trough 1 and extends lengthwise thereof and parallel thereto. A second, grounded electrode 8 is disposed beneath the trough and parallel to the trough and electrode 7. Trough 1 is formed of a polymeric material which has good dielectric properties, i.e., has a low dielectric constant and a low power factor and is therefore not significantly heated by radio frequency energy. As later described in more detail, the lower electrode 8 is advantageously a hollow, liquid cooled electrode, with a coolant, such as a machine oil which is not a conductor for radio frequency energy, supplied via input conduit 9 and outlet conduit 10, the oil being maintained at a suitable low temperature by being passed through a conventional heat exchanger (not shown). The combination of trough 1, vibrator 3 and electrodes 7, 8 is enclosed in a suitable radio frequency shielding structure 11, which can be of sheet aluminum. An adjustable levelling blade 12 is provided to determine the depth of the bed of particulate material on the bottom of trough 1.

With the particulate material having an initial free moisture content of at least 0.5% by weight, and employing radio frequency energy typically at a frequency of 5–100 MHz. and a power level appropriate for dielectric heating, the free native moisture contained by the particles is heated dielectrically and a substantial proportion thereof is driven to the surfaces of the particles. Though the precise manner in which radio frequency energy, for example, heats the moisture contained in solid material may not be fully understood, it is thought that the radio frequency energy excites the water molecules in such a manner that, at any instant, the molecules are driven in the direction exhibited by the field. As the radio frequency field goes positive, the water molecules are driven in one direction and, as the field reverses polarity, the molecules seek to reverse their direction of travel. Thus, if the frequency of the field is 70 MHz., orientation of water molecules exposed to the field tends to reverse 140 million times per second. Frictional heat results, being generated in the water molecules, and vaporization occurs almost instantaneously with the application of the energy. Since the dielectric heating does not directly heat the solid matter of the particles, and since the atmosphere surrounding the particles is relatively cool, the moisture persists at the particle surfaces in liquid state for the extremely short time period needed for agglomeration. With vibrator 3 operating continuously to agitate the particles, agglomeration occurs by inter-particle adherence, generally in the manner characteristic of prior art agglomerating methods which depend on added moisture. In the present method, however, agglomeration is improved both because the moisture driven out of the particles by the dielectric heating is distributed very uniformly over the particle surfaces and because, at the outset, the particles themselves are cool.

Unlike prior art agglomerating methods based on introduction of extraneous moisture, agglomeration according to the invention does not require drying of the agglomerated product. In some cases, however, it is desirable or necessary to cool the agglomerated product. In this connection, use of radio frequency electromagnetic radiation results at the outset in a maximum dielectric heating of the free moisture contained by the particles and only a minimum heating of the solid matter, but the heat imparted to the contained free moisture tends to transfer to the particles themselves, and the agglomerated material therefore may be discharged from the agglomeration zone at a temperature which, depending on the nature of the particulate material, may require cooling. Thus, with particulate materials such as dehydrated citrus juices, it is desirable to cool the agglomerated material to, e.g., room temperature before packaging or otherwise handling the material. Such cooling is easily accomplished by employing a pneumatic conveyor to conduct the agglomerated material away from the agglomeration zone.

In the typical apparatus of FIG. 2, the agglomerated material is delivered via a funnel 13 to a conduit 14 communicating with a chamber 15 at a lateral point near the top of the chamber. Chamber 15 has a bottom opening to which a vertically depending discharge conduit 16 is connected, passage of material through conduit 16 being controlled by a valve 17. Within chamber 15, a partition 18 slants downwardly toward discharge conduit 16, the partition being spaced from the discharge opening of conduit 14 by a distance greater than its spacing from the location of discharge conduit 16. The bottom edge of partition 18 is spaced slightly above the bottom wall of chamber 15. At its top, in a location on the side of partition 18 opposite conduit 14, chamber 15 is provided with an opening communicating with a conduit 19 connected to a vacuum pump P. With vacuum pump P operating continuously, a current of atmospheric air is drawn through conduit 14 into chamber 15, and the agglomerated material discharged from trough 1 is entrained in that air current. When the agglomerated material enters chamber 15, the solid material impinges on partition 14 and descends by gravity into discharge conduit 16.

Conveying the agglomerated material for even a relatively short distance by entraining the material in a current of air at 40°-50° F., or even in a current of room temperature air, provides adequate cooling.

The method is effective to agglomerate all finely particulate free-flowing solid materials which are capable of agglomerating by inter-particle adherence when the particles are moistened and which contain at least 0.5% by weight free moisture. The method is especially advantageous for agglomerating by inter-particle adherence when the particles are moistened and which contain at least 0.5% by weight free moisture. The method is especially advantageous for agglomerating materials which are sensitive to heat, so that thermal drying is undesirable. Such materials include, for example, dehydrated citrus juices, dehydrated vegetable juices, and nitrocellulose-based gun powders. In the case of dehydrated orange juice, for example, thermal treatment is undesirable because it tends to make the particles excessively sticky and because it promotes organoleptic deterioration. The method is particularly effective for agglomerating cereal flours and meals, including not only wheat flours but also the more difficultly agglomeratable corn flours and corn meals. Similarly, the method is capable of agglomerating legume flours and meals, particularly the defatted or low-fat soybean flours. More highly concentrated proteinaceous materials, such as soy protein hydrolysates, are also agglomeratable according to the invention, as are the various powdered milk products. Sugars and starches, broadly considered, are suitable materials for agglomeration according to this method. Pharmaceuticals, including both pure compounds and mixtures, can be agglomerated according to the invention, to increase their rate of solution, so long as the initial material has a free moisture content of at least 0.5% by weight. And, rather than being applied to individual materials, the invention can be employed to agglomerate mixtures of two or more particulate materials capable of agglomeration by inter-particle adherence when moistened. Thus, powdered drink mixes comprising, for example, cocoa, milk solids, sucrose, and malt can be agglomerated according to the invention, as can cake mixes, biscuit mixes, pudding mixes, pie filling mixes, and the like.

While any electromagnetic radiation capable of heating the free water content of the articles to be agglomerated can be employed, it is most advantageous to employ radio frequency electromagnetic radiation because such radiation causes essentially instantaneous heating of the moisture content selectively, with no or negligible heating of the solid matter of the particle at the outset. Selective heating of the moisture assures that at least a major proportion of the free moisture content of the particle will appear in liquid state at the particle surfaces, without specially cooling the atmosphere surrounding the particles, since the solid matter of the particles will not have been significantly heated. Thus, employing radio frequency energy, the gaseous atmosphere surrounding the particles can be room temperature air, and the moisture will persist in liquid state until agglomeration has occurred, since the particle surface temperatures are not high enough to cause extensive rapid vaporization. For a wide range of agglomeratable materials, radio frequency energy supplied by a conventional Model EO-1 RF generator manufactured by W. T. Larose & Associates, Inc., Troy, N.Y., with a power output (useful RF power capacitively coupled into the load) of 500 watts, operated at a frequency of at least 5 MHz. at an RF voltage of at least 10,000 and a generator plate current of at least 150 milliamperes is effective. For agglomerating edible juice crystals, particularly orange juice crystals; dehydrated potatoes; milk powders; soy protein concentrates and hydrolysates; and nitrocellulose base gun powder, the method is most effective when radio frequency energy at a frequency in the range of 10-35 MHz. is employed. For coffee and tea crystals, radio frequency energy at a frequency in the range of 10-50 MHz. is most effective.

For practical purposes, it is convenient and advantageous to employ room temperature air as the relatively cool gaseous atmosphere maintained in the agglomeration zone, and the air can even be at temperatures higher than room temperature for materials such as dehydrated coffee. Thus, air temperatures as high as 110° F. are still relatively cool in the sense that they are well below those temperatures which would drive the moisture too rapidly to vapor state. In some cases, it is advantageous to cool the gaseous atmosphere maintained in the agglomeration zone. For hygroscopic materials such as dehydrated citrus juice, however, it is more important to keep a low humidity than to specially cool the air. Thus, in agglomerating dehydrated orange juice in powder form, the atmosphere in the agglomeration zone is advantageously air at 70° F. and a relative humidity of 20%, though the method has been successfully carried out to agglomerate dehydrated orange juice with the air at a relative humidity as high at 68%.

An initial free moisture content of at least 0.5% by weight is necessary in order that there be a quantity of moisture driven to the particle surfaces which will be adequate to accomplish the particle-to-particle adherence necessary for agglomeration. The initial free moisture content can be much higher than 0.5% by weight, however, so long as the particulate material is free-flowing. In general, the initial free moisture content should not be greater than 15% by weight and, for material which inherently tend to be sticky, such as dehydrated citrus juices, it is advantageous to keep the initial free moisture content of the particles below 10% by weight.

TYPICAL APPARATUS FOR PRACTICING THE METHOD

Figures 3, 4, 5:
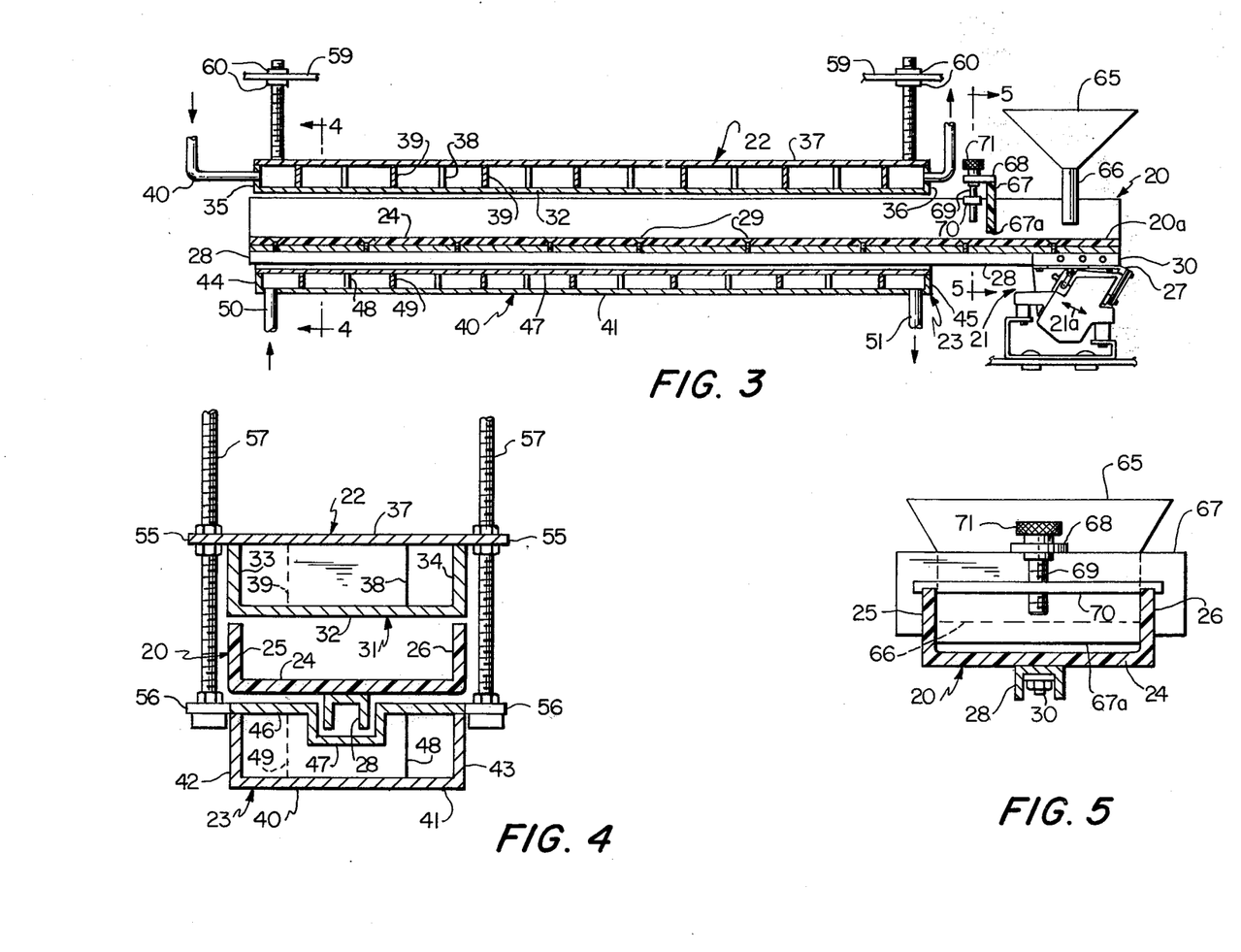
FIG. 3 is a longitudinal vertical sectional view of one particularly advantageous agglomerator useful in the apparatus of FIG. 2.
FIGS. 4 and 5 are transverse sectional views taken generally on lines 4—4 and 5—5, FIG. 3, respectively.

FIGS. 3-5 illustrate a particularly advantageous apparatus for carrying out the method. Here, the apparatus comprises a generally horizontal trough 20, a conventional electromagnetic vibrator 21, an upper electrode 22, and a lower electrode 23.

Trough 20 consists of an elongated integral body formed of polymeric material having good dielectric properties, i.e, a low dielectric constant and a low power factor, so as not to be unduly heated by radio frequency energy. Typically, the trough can be of polytetrafluoroethylene, or of a fiber glass reinforced epoxy resin, or a fiber glass reinforced silicone polymer. The trough is of U-shaped transverse cross section, having a flat bottom wall 24 and flat side walls 25, 26, and can be open at both ends. Trough 20 can be supported in horizontal position solely via its connection to vibrator 21, or additional supporting means (not shown) of the vibration isolator type can be employed.

Vibrator 31, FIG. 3, is stationarily mounted and includes a vibratory output member 27. A rigid channel member 28 extends along the bottom face of bottom wall 24 of the trough, being aligned along the longitudinal center line of the trough and rigidly secured to bottom wall 24, as by fasteners 29 made of polymeric material. The output member 27 of vibrator 21 is secured to the bottom face of a block 30 which is disposed in and secured rigidly to the end portion of channel member 28. Block 30 can be of rigid dielectric material to provide additional RF isolation for the vibrator.

Electrodes 22 and 23 are elongated hollow metal electrodes of rectangular plan conforming to that of the trough. Advantageously, the electrodes are of aluminum. Electrode 22 comprises a body 31 having a flat rectangular bottom wall 32, flat side walls 33 and 34, and flat end walls 35 and 36, the top of the hollow structure defined by body 31 being closed by a flat top plate 37. A plurality of partitions 38 project inwardly from wall 33, and a plurality of partitions 39 extend inwardly from wall 34, the partitions being shorter than the space between the side walls. Partitions 38 are spaced apart lengthwise of the electrode, as are partitions 39, and the two sets of partitions alternate so that one partition 38 is located between each adjacent pair of the partitions 39, and the partitions and the electrode walls thus cooperate to define a tortuous flow path from end wall 35 to end wall 36. A cooling water supply tube 40 opens through end wall 35 to supply water to the interior of the electrode, and the cooling water is discharged via an exhaust tube which opens through end wall 36.

Electrode 23 similarly comprises a main body 40 having a flat rectangular bottom wall 41, flat side walls 42 and 43, and flat end walls 44 and 45, the top of the hollow structure defined by body 40 being closed by a top member 46 which is mainly flat but includes a longitudinally extending central channel 47 dimensioned to freely accommodate member 28. Alternating partitions 48, 49 are provided as described with reference to partitions 38, 39. Cooling liquid is supplied to the interior of electrode 23 by a supply tube 50 at end wall 44 and is discharged via exhaust tube 51 at end wall 45.

Electrodes 22 and 23 are connected to a suitable radio frequency generator, as shown in FIG. 2, in any suitable fashion, as by a coaxial cable.

Electrodes 22 and 23 are of equal length and are mutually parallel and in vertical alignment. Trough 20 is longer than electrodes 22, 23 and is disposed between the two electrodes, with the input end 20a of the trough projecting well beyond the respective vertically aligned ends of the electrodes. A delivery funnel 65 is arranged above the delivery end 20a of the trough, being supported by any suitable support means, such as the shielding means for the apparatus (not shown), independent of the trough. As seen by comparison of FIGS. 3 and 5, the spout 66 of the funnel is of elongated rectangular cross section, the width of the spout being only slightly less than the space between side walls 25, 26 of trough 20, and the funnel being so positioned that the open bottom end of spout 66 is spaced above bottom wall 24 of the trough by a distance slightly greater than the depth desired for the bed of particulate material to be established in the trough.

Between funnel 65 and electrodes 22 and 23, an adjustable blade 67 is provided to assure that the depth of the bed of particulate material will be essentialy uniform across the width of the trough. Blade 67 is in the form of a flat plate of polytetrafluoroethylene or equivalent dielectric material, the plate being slotted near its ends to accommodate side walls 25, 26 of the trough in slidable fashion so that, with the blade lying in a vertical plane, it can be moved upwardly or downwardly to adjust the distance between the bottom edge 67a of the blade and bottom wall 24 of the trough. A projection 68 is secured to blade 67 at the top thereof and projects toward the electrodes. A vertical adjusting screw 69 has an unthreaded shank portion journalled in projection 68, the threaded shank of the screw depending therefrom and being engaged in a threaded bore through a cross member 70, the ends of the cross member being rigidly fixed to side walls 25 and 26, respectively. Knurled head 71 of the screw 69 is exposed above support 68 so that manual manipulation of the screw to adjust the vertical position of blade 67 is easily accomplished. Elements 68-71 are advantageously of rigid polymeric material having good dielectric characteristics so as not to be unduly heated by radio frequency energy.

Vibrator 21 acts through rigid output member 27 and channel member 28 to vibrate trough 20 at relatively high frequency and low amplitude in the direction of arrow 21a. During each cycle of vibratory movement, the trough is moved through a very short distance upwardly and away from vibrator 21 and then in the reverse direction, downwardly and toward the vibrator. By design and adjustment of the vibrator 21, the frequency and amplitude of the vibratory movement of the trough can be predetermined in accordance with the particle size and density of the particulate material involved, and the throughput rate (and thus the residence time) required for the particular thermal treatment to be accomplished. Advantageously, the trough is vibrated at a frequency of 3600 cycles per minute, with an amplitude or excursion of, e.g., less than 1/16 inch.

The particulate solid material is supplied at a constant rate such as to establish on the bottom wall of trough 20 a bed of particulate material having a static depth, i.e., that depth which would exist if the trough were not vibrating, typically on the order of 1/16 inch, the bed being rendered uniform by the levelling action of blade 67. The vibratory motion imparted to the trough by vibrator 21 serves two functions, which can be considered broadly as conveying and agitating. Conveying occurs because the upward portion of each cycle of vibratory motion of bottom wall 24 of the trough projects all of the particles upwardly and toward the delivery end of the trough, the particles then being out of engagement with the bottom wall until the upward portion of the next cycle of movement. Thus, considering the idealized case of only a single particle, rather than a bed of particles, the single particle is engaged and projected by a different point on the surface of the bottom wall during each cycle of the vibratory movement, the points being spaced apart by small distances so as to lie in a series progressing from the input end to the discharge end of the trough. The agitating effect has two advantageous characteristics. First, since contact between the particles and bottom wall 24 of the trough is instantaneous, the particles are kept in essentially constant movement and, as a result of that movement, the surfaces of the particles are subjected to the air or other gaseous atmosphere in which the trough is located rather than being in long term contact with the solid surfaces of the trough or the surfaces of adjacent particles. Next, since the static depth of the bed of particles is large in comparison to the particle size, frequent particle-to-particle contact, random in nature, occurs. Additionally, with side walls 25, 26 of the trough having a height which is large in comparison with the bed thickness and the amplitude of vibratory movement, trough 20 serves to confine the particulate material to a path of travel which is between and aligned longitudinally with the elongated electrodes 22 and 23.

A particular advantage of the apparatus is that it makes it impossible to pass a mass of particulate material through a defined treating zone and to subject the material to radio frequency energy throughout its residence time in the treating zone, with each particle and each agglomerate being subject to only a minimum of contact with surfaces other than those of the particulate material during the treatment. A more predictable and assured treatment is thus accomplished than has heretofore been possible with apparatus in which the particulate material is supported as a static bed.

The embodiment of FIGS. 3-5 has the advantage that the surfaces of the trough are of inert material so that, for example, particulate materials which cannot safely be passed in contact with metal can be treated. Thus, the embodiment of FIGS. 3-5 can be employed to dry smokeless powder. This embodiment also has the distinct advantage that the thermal input to the particulate material being treated is essentially limited to the heat resulting from dielectric heating of the free moisture contained by the particles, both electrodes 22 and 23 being water-cooled.

Figure 6:
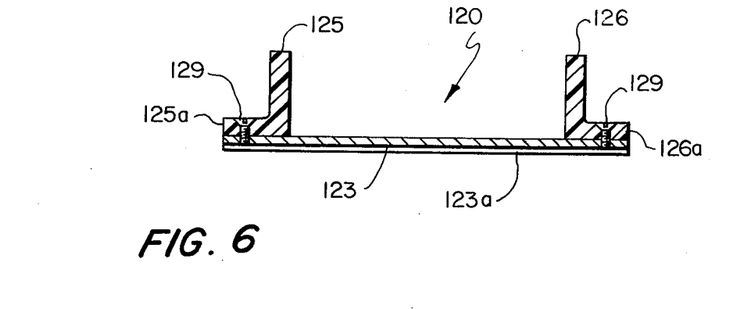
FIG. 6 is a transverse sectional view illustrating a portion of the agglomerator according to another embodiment of the invention.

Alternatively, the trough 20 and lower electrode 23 can be replaced by the combined trough and electrode shown in FIG. 6. Here, the trough 120 comprises two spaced, parallel side members 125, 126 formed of polytetrafluoroethylene or the like, the side members having an outwardly projecting base flange 125a, 126a, respectively, and being secured by nylon screws 129 to a flat metal plate 123 which constitutes the lower electrode of the apparatus. Metal plate 123 extends only for a portion of the total length of the trough, including the output end. The bottom wall of the trough is completed by a rigid dielectric plate 123a, to which the rigid channel member 28, FIG. 3, can be secured, so that the trough is supported by the channel member and additional conventional vibration isolator means (not shown), the support rods 57, FIGS. 3 and 4, serving only to support the upper electrode 22. In the embodiment of FIG. 6, lower electrode 123 is not specially cooled.

The following examples are illustrative of the invention.

EXAMPLE 1

Pure orange juice crystals were produced on a continuous basis by foam drying and the total product stream supplied to a continuous classifying apparatus which separated the particulate material into a salable product fraction, all of the particles of which had a maximum dimension in the range of 250-600 microns, and a "fines" fraction, all of the particles of which had a maximum dimension less than 250 microns. The fines were fed continuously to an apparatus constructed generally as shown in FIG. 2, at a rate of approximately 110 lbs. per hr. While the moisture content of the fines showed some variation, the free moisture content was between 2 and 3% by weight throughout the experiment. A Model 23 A-LH radio frequency generator supplied by W. T. LaRose & Associates, Inc., Troy, N.Y., and having a rated power output (useful RF power capacitively coupled into the load) of 3.5 Kilowatts was employed. The radio frequency generator was operated at an RF voltage of 12,000 volts and a plate current of 2.0 amp. to supply radio frequency energy across the vibrating conveyor at a frequency of 30 MHz. The conveyor vibrator was operated at approximately 3600 cycles per minute and amplitude of approximately 0.01 in. (0.25 mm.). As a result, the fines were moved through the agglomerating zone in the form of a thin bed having a static depth of approximately 1/16 in. (1.59 mm.), the total residence time in the agglomeration zone being approximately 3 seconds. The ambient atmosphere was air at 70° F. and a relative humidity of 18-20%. The temperature of the fines delivered to the vibrating conveyor was 75° F. The temperature of the agglomerated product at the delivery end of the vibrating conveyor was in the range of 93°-97° F. throughout the experiment. The agglomerated product was conveyed away from the agglomeration zone continuously by a current of air at 40°-50° F. and was collected as a dry, free flowing material suitable to be combined with the salable product portion of the product from the foam drying procedure.

The fines agglomerated continuously during passage through the RF field. As recovered, the agglomerated material had an average particle size of about 500 microns, with all of the material being within the range of 250-600 microns. The moisture content of the agglomerated product was in the range of 1.50-1.75% by weight throughout the experiment. The agglomerated product had the characteristic orange-yellow color of orange juice crystals, but the color of the agglomerated product was three shades darker than that of the fines, so that the agglomerated material was visually more attractive than the fines. The agglomerated material dissolved readily in cold water, while it was not possible to dissolve the original fines in cold water by simple stirring. Reconstituted orange juice was prepared from the agglomerated material and from the salable product fraction of the foam dryer production stream, under identical conditions with a ratio of 5 parts water to 1 part orange juice crystals, and the two juices were subjected to taste panel comparison. The panel found it impossible to distinguish between the two reconstituted juices.

EXAMPLE 2

Tomato juice crystals produced by foam drying were separated into a salable product fraction and a fines fraction. The salable product fraction had an average particle size of about 1500 microns, all of the particles of that fraction being in the range of 1150–3000 microns. All of the particles of the fines were smaller than 1150 microns. The fines were passed through the same apparatus employed in the experiment of Example 1, with the residence time about 3 seconds, the vibrator operating at about 3600 cycles per minute, the static bed depth about 1/16 in. (1.59 mm.), and the radio frequency generator operating at 1200 RF volts and a plate current of 2.0 amp. to establish an RF field with a frequency of 30 MHz. Temperature of the ambient atmosphere was 75° F. and the relative humidity was approximately 20%. The moisture content of the fines was 3.1% by weight.

The agglomerated product had an average particle size of about 1300 microns, all of the product being in the range of 1150–3000 microns. There was no appreciable difference between the color of the fines and that of the agglomerated material. The agglomerated material had a moisture content of 1.97%. The agglomerated product dissolved essentially instantly in cold tap water with simple stirring, while the fines could not be easily dissolved in cold water. Juices prepared in identical fashion from the salable product fraction and the agglomerated product were indistinguishable.

EXAMPLE 3

Spray dried tea, produced conventionally, was separated into a salable fraction and a "fines" fraction. The fines fraction was an extremely fine powder which could be dissolved in water only with difficulty and which had a moisture content of 5% by weight. The fines fraction was supplied continuously to an apparatus constructed according to FIG. 2, and the vibrating conveyor operated at 3600 cycles per minute and an amplitude of about 0.009 in. (0.23 mm.) to pass the material through the apparatus continuously, with a residence time of approximately 4 sec. The radio frequency generator was operated at 15,000 RF volts and a plate current of 2.0 amp. to supply radio frequency energy across the conveyor trough at a frequency of 13.3 MHz. The product delivered by the vibratory conveyor was visually indistinguishable from the salable spray dried fraction, dissolved readily in water with simple stirring, and had a moisture content of 3% by weight.

EXAMPLE 4

Bakers' wheat flour having a moisture content of 10.5% and of a fineness such that all of the particles have a maximum dimension smaller than 150 microns is supplied to the apparatus of FIG. 2 continuously at a rate to provide a residence time of approximately 4 seconds with a static bed depth of 1/16 in. (1.59 mm.). The radio frequency generator is operated at an RF voltage of 12,000 volts and a plate current of 2.0 amps. to supply radio frequency energy across the vibrating conveyor at a frequency of 30 MHz. The conveyor is vibrated at 3600 cycles per minute. The procedure is carried out in an atmosphere of room temperature air at a relative humidity of 20%. The product delivered from the vibratory conveyor is an agglomerated flour which is of much more uniform particle size than the original flour, is of markedly larger average particle size, has a moisture content of 8–8.5%, and, unlike the original flour, can be dispersed in water with relative ease.

It will be noted that, regardless of the material being agglomerated, the method results in a decrease in the moisture content, so that need for a supplementary drying step is eliminated.

Though most of the materials to be agglomerated are characteristically substantially free from viable microorganisms, the method inherently destroys most of the microbiological populations usually encountered in foods and organic materials, including particularly *E. coli, salmonella, bacillus stearothermophilus,* and *bacillus subtillus.*

What is claimed is:

1. The method for agglomerating a finely divided particulate solid material which is capable of agglomerating by inter-particle adherence when the surfaces of the particles are moistened but which, though having a free native moisture content of at least 0.5% by weight, is dry in the sense of being free-flowing and having insufficient surface moisture to exhibit inter-particle adherence, comprising
   introducing said particulate material into an agglomeration zone;
   agitating the particulate material in the agglomeration zone to effect random particle-to-particle contact adequate to cause agglomeration when the particles have adequate surface moisture;
   subjecting the particulate material, while being so agitated in the agglomeration zone, to electromagnetic radiation to heat the free native moisture within each particle, without substantial direct heating of the particle itself, and thereby causing free moisture from within the particle to appear in liquid state at the surface of the particle,
   continuance of agitation then causing agglomeration to occur by inter-particle adherence though no moisture extraneous to the particulate material has been introduced into the agglomeration zone; and
   recovering the agglomerated material as a product which contains less moisture than when introduced into the agglomeration zone and which does not require drying.

2. The method according to claim 1, and further comprising
   maintaining a relatively cool gaseous atmosphere within the agglomeration zone during said steps of agitating the particulate material and subjecting the particulate material to electromagnetic radiation.

3. The method according to claim 2, wherein
   said step of subjecting the particulate material to electromagnetic radiation comprises subjecting the particulate material to radio frequency energy.

4. The method according to claim 3, wherein
   the particulate material to be agglomerated is a dehydrated edible juice in powder form.

5. The method according to claim 4, wherein
   the dehydrated juice is a citrus juice.

6. The method according to claim 5, wherein
   said dehydrated citrus juice has an initial free moisture content not exceeding 10% by weight.

7. The method according to claim 3, wherein
the particulate material to be agglomerated is a dehydrated vegetable juice.

8. The method according to claim 3, wherein
the particulate material to be agglomerated is selected from the group consisting of cereal flours and meals.

9. The method according to claim 3, wherein
the particulate material to be agglomerated is selected from the group consisting of soybean flours and meals.

10. The method according to claim 3, wherein
the particulate material to be agglomerated is a protein hydrolysate.

11. The method according to claim 3, wherein
said step of recovering the agglomerated material comprises
   removing the agglomerated material from the agglomeration zone; and
   cooling the material so removed by passing cool air over the agglomerated material.

12. The method according to claim 1, wherein
the particulate material is conveyed continuously through the agitation zone and said step of agitating the particulate material is carried out throughout travel of the particulate material through the agitation zone; and
said step of subjecting the particulate material to electromagnetic energy is carried out by establishing a radio frequency field between two electrodes spaced apart across the path of travel of the particulate material.

13. The method according to claim 12, wherein
both conveying and agitation of the particulate material are carried out by depositing the particulate material on a generally horizontally extending vibratory conveying member of dielectric material and vibrating said conveying member.

14. The method according to claim 13, wherein
said electrodes are arranged one above and one below the conveying member,
the method further comprising
cooling at least the one of said electrodes which is below the conveying member.

15. The method according to claim 12, and further comprising
delivering the agglomerated material into a conveying current of cool air to dissipate heat from the agglomerated material.

* * * * *